United States Patent
Hu et al.

(10) Patent No.: US 11,105,980 B1
(45) Date of Patent: Aug. 31, 2021

(54) DEMULTIPLEXER AND RELATED METHOD TO PROCESS MULTIPLEXED OPTICAL INPUTS

(71) Applicant: GLOBALFOUNDRIES U.S. Inc., Santa Clara, CA (US)

(72) Inventors: Shuren Hu, Arcadia, CA (US); Andreas D. Stricker, Essex Junction, VT (US); Karen A. Nummy, Newburgh, NY (US); David B. Riggs, Fairfield, CT (US); Kenneth J. Giewont, Hopewell Junction, NY (US); Jessie C. Rosenberg, Cambridge, MA (US)

(73) Assignee: GLOBALFOUNDRIES U.S. INC., Santa Clara, CA (US)

( * ) Notice: Subject to any disclaimer, the term of this patent is extended or adjusted under 35 U.S.C. 154(b) by 0 days.

(21) Appl. No.: 16/841,963

(22) Filed: Apr. 7, 2020

(51) Int. Cl.
 *G02B 6/28* (2006.01)
 *G02B 6/293* (2006.01)
 *H04J 14/02* (2006.01)

(52) U.S. Cl.
 CPC ....... *G02B 6/29355* (2013.01); *G02B 6/2938* (2013.01); *G02B 6/29385* (2013.01); *G02B 6/29395* (2013.01); *H04J 14/02* (2013.01); *H04J 14/021* (2013.01); *H04J 14/0209* (2013.01); *G02B 6/2804* (2013.01)

(58) Field of Classification Search
 CPC ............ G02B 6/29355; G02B 6/29395; G02B 6/29385; G02B 6/2938; G02B 6/2804; H04J 14/0209; H04J 14/021; H04J 14/02
 See application file for complete search history.

(56) References Cited

U.S. PATENT DOCUMENTS

| 7,840,103 | B2 * | 11/2010 | Chen | G02B 6/29355 385/24 |
| 8,032,027 | B2 * | 10/2011 | Popovic | G02B 6/29395 398/82 |
| 8,213,799 | B2 * | 7/2012 | Little | G02B 6/12004 398/82 |

(Continued)

OTHER PUBLICATIONS

Bogaerts et al., "Compact Wavelength-Selective Functions in Silicon-on-Insulator Photonic Wires," IEEE Journal of Selected Topics in Quantum Electronics, vol. 12, No. 6, Nov./Dec. 2006, pp. 1394-1401.

(Continued)

*Primary Examiner* — Ryan A Lepisto
(74) *Attorney, Agent, or Firm* — Hoffman Warnick LLC (57) ABSTRACT

Embodiments of the disclosure provide a demultiplexer for processing a multiplexed optical input. The demultiplexer may include a plurality of Mach-Zehnder Interferometric (MZI) stages for converting the multiplexed optical input into a plurality of component optical signals. Each of the plurality of component optical signals corresponds to a respective wavelength-space component of the multiplexed optical input. A plurality of bandpass filters, each having a respective wavelength passband, may receive one of the plurality of component optical signals. The plurality of bandpass filters generates a plurality of demultiplexed optical signals based on the plurality of component optical signals.

15 Claims, 7 Drawing Sheets

(56) References Cited

U.S. PATENT DOCUMENTS

| | | | |
|---|---|---|---|
| 8,837,548 B2 * | 9/2014 | Tanaka | H01S 5/1032 |
| | | | 372/50.11 |
| 9,735,542 B2 * | 8/2017 | Li | H01S 5/1032 |
| 9,780,528 B1 * | 10/2017 | Zheng | H01S 5/021 |
| 10,312,999 B2 * | 6/2019 | Neuman | H04B 7/18515 |
| 10,439,729 B2 * | 10/2019 | Akiyama | G02B 6/29352 |
| 2009/0245801 A1 * | 10/2009 | Little | H04J 14/02 |
| | | | 398/89 |
| 2020/0382217 A1 * | 12/2020 | Younce | H04B 10/614 |

OTHER PUBLICATIONS

Horst et al., "Cascaded Mach-Zehnder wavelength filters in silicon photonics for low loss and flat pass-band WDM (de-)multiplexing," Optics Express 11652, vol. 21, No. 10, May 20, 2013, 7 pages.
Horst et al., "Silicon photonic WDM devices: simulation, design, and implementation," Proc. of SPIE vol. 7386, Photonics North 2009, 10 pages.

* cited by examiner

DEMULTIPLEXER AND RELATED METHOD TO PROCESS MULTIPLEXED OPTICAL INPUTS

TECHNICAL FIELD

Embodiments of the disclosure relate generally to a demultiplexer and related method to process a multiplexed optical input. More specifically, the disclosure relates to a demultiplexer and related method for applying multiple Mach-Zehnder Interferometric (MZI) stages and bandpass filters to separate a multiplexed optical input into multiple demultiplexed optical outputs.

BACKGROUND

The rise of networking devices, such as the "Internet of Things" (IoT), with links to a data center has accompanied a larger number of signal-processing elements in semiconductor wafers. Semiconductor chips may be modified, adapted, etc., to house the various components needed to transmit light from one component to another. Semiconductor chips which include photonic devices and microcircuitry are known as "photonic integrated circuits" (PICs). PIC dies typically include optical components on the surface or at the edge of a PIC die to transmit light into and from the optical devices therein such as waveguides and grating couplers. The various optical components, e.g., photonic waveguides, photonic transmitters and receivers, etc., can relay signals through light transmission.

The processing of photonic signals often requires multiplexing and demultiplexing of optical signals. Multiplexing of an optical signal refers to encoding a set of distinct optical signals by constructing a single encoded optical signal for transmission. Demultiplexing of an optical signal is the opposite process, i.e., decoding and splitting the multiplexed optical signal into its original set of demultiplexed signals. A technical challenge of multiplexing and demultiplexing is maintaining signal fidelity while avoiding losses in quality from, e.g., optical interference, crosstalk between demultiplexed signal components, and possible reductions in operating frequency. Further complications may arise when the same hardware components implement multiplexing and demultiplexing functions for incoming and outgoing optical signals.

SUMMARY

Aspects of the present disclosure provide a demultiplexer for processing a multiplexed optical input, the demultiplexer including: a plurality of Mach-Zehnder Interferometric (MZI) stages for converting the multiplexed optical input into a plurality of component optical signals, each of the plurality of component optical signals corresponding to a respective wavelength-space component of the multiplexed optical input; and a plurality of bandpass filters each having a respective wavelength passband, and receiving a respective one of the plurality of component optical signals, wherein the plurality of bandpass filters generates a plurality of demultiplexed optical signals based on the plurality of component optical signals.

Further aspects of the present disclosure provide a demultiplexer for processing a multiplexed optical input, the demultiplexer including: a first Mach-Zehnder interferometric (MZI) stage receiving the multiplexed optical input, wherein the first MZI stage converts the multiplexed optical input into a first intermediate optical signal and a second intermediate optical signal; a second MZI stage receiving the first intermediate optical signal from the first MZI stage, wherein the second MZI stage converts the first intermediate optical signal into a first component optical signal and a second component optical signal; a third MZI stage receiving the second intermediate optical signal from the first MZI stage, wherein the third MZI stage converts the second intermediate optical signal into a third component optical signal and a fourth component optical signal; and a plurality of bandpass filters each having a respective wavelength passband, and receiving a respective one of the first component optical signal, the second component optical signal, the third component optical signal, and the fourth component optical signal, wherein the plurality of bandpass filters generates a plurality of demultiplexed optical signals based on the first component optical signal, the second component optical signal, the third component optical signal, and the fourth component optical signal.

Other aspects of the present disclosure provide a method for demultiplexing an optical signal transmitted from a multiplexer, the method including: generating a plurality of component optical signals by transmitting a multiplexed optical input through a plurality of Mach-Zehnder Interferometric (MZI) stages, each of the plurality of component optical signals corresponding to a respective wavelength-space component of the multiplexed optical input; and generating a plurality of demultiplexed optical signals based on the plurality of component optical signals by transmitting the plurality of component optical signals to a plurality of bandpass filters each having a respective wavelength.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

The present disclosure relates to a demultiplexer and related method for processing multiplexed optical inputs. Embodiments of the disclosure may be implemented on photonic integrated circuit (PIC) dies. PIC dies may include semiconductor wafers structured to include electrical components (e.g., wires, vias, transistors, and other devices) as well as photonic elements (e.g., an optical waveguide, photodiode, thermal phase shift elements, ring filters, etc.) for transmitting and/or processing photonic signals. PIC dies may include hardware components for the multiplexing and/or demultiplexing of optical signals before they are transmitted to other portions of the PIC die for processing.

Embodiments of the disclosure may include, e.g., a demultiplexer for processing a multiplexed optical input to produce a plurality of demultiplexed optical signals, each of which may be structurally integrated into a PIC die. Further embodiments of the disclosure provide methods for demultiplexing an optical input into a plurality of demultiplexed optical signals. A demultiplexer according to embodiments of the disclosure may include, e.g., two or more stages. One stage of the demultiplexer may include a plurality of Mach-Zehnder Interferometric (MZI) stages for converting the multiplexed optical input into a plurality of component optical signals. Each component optical signal may correspond to a wavelength-space component of the original signal, i.e., indicating a component of the signal between a predetermined minimum wavelength and maximum wavelength. Another stage of the demultiplexer may include a plurality of bandpass filters each having a respective wavelength passband. The wavelength passband of each bandpass filters determines minimum and maximum limits on wavelength for optical signals to be filtered, and optical signals with wavelengths above the maximum limit or below the minimum limit will be rejected (i.e., filtered) before traveling to other components. Together, these stages of the demultiplexer will yield multiple demultiplexed optical signals, each of which correspond to a corresponding range of wavelengths of the multiplexed optical input.

Figure 1:
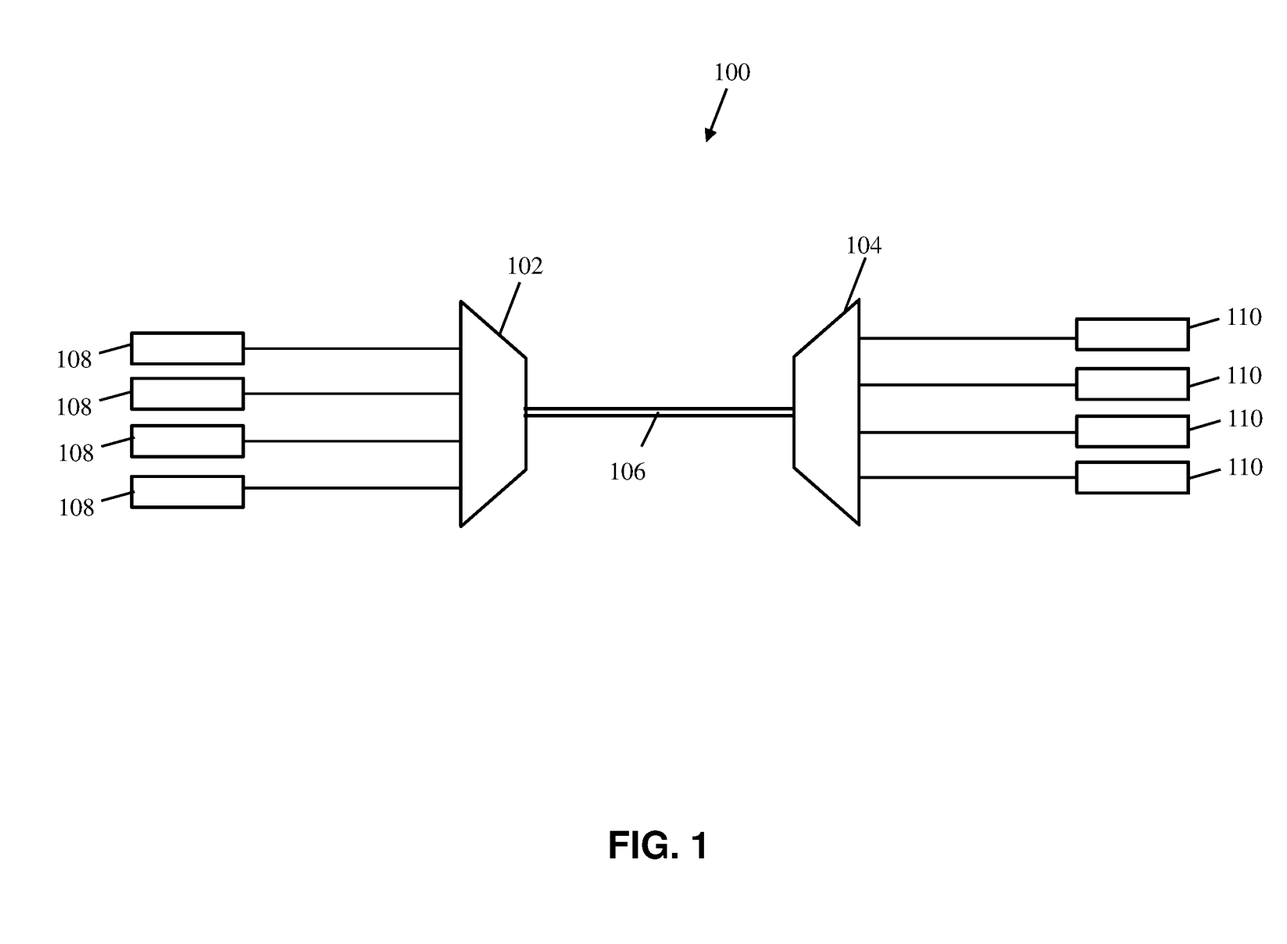
FIG. 1 shows a schematic view of an optical multiplexer-demultiplexer assembly for encoding and decoding of optical signals according to embodiments of the disclosure.

FIG. 1 provides a schematic diagram of a multiplexer-demultiplexer assembly (simply "assembly" hereafter) 100 according to embodiments of the disclosure. Assembly 100 may be formed on a PIC die or other structure configured for the processing of optical and electrical signals. Assembly 100 may include a multiplexer 102 and a demultiplexer 104 connected to each other in series through an optical fiber 106 or other light conducting medium. Optical fiber 106 is configured to transmit a multiplexed optical input from one location to another. Multiplexer 102 may be coupled to, e.g., one or more optical encoders 108 for transmitting a group of distinct optical signals based on corresponding electrical inputs. Multiplexer 102 may include one or more components for aggregating the encoded optical inputs as a multiplexed optical signal for transmission through optical fiber 106. More specifically, multiplexer 102 may aggregate multiple optical signals into a single optical signal, e.g., by superposition and/or by phase offset techniques for converting multiple optical signals into a single multiplexed optical signal. Demultiplexer 104, which may be located on another device or PIC die, or elsewhere on the same device or PIC die, may be configured to receive the single optical signal from optical fiber 106. Demultiplexer 104 may convert the single optical signal into a group of demultiplexed optical signals, each of which may correspond to one input signal to multiplexer 102. Each converted optical signal may be transmitted to one or more optical components 110 configured for interpreting the transmitted signals and/or implementing various functions based on the information therein. Embodiments of assembly 100 differ from conventional Mux-Demux assemblies by including demultiplexer 104 with various distinguishing features. Demultiplexer 104 may include various features and components, and/or may implement various methodologies, for reducing signal loss and/or crosstalk between different signal components as optical information is demultiplexed from optical fiber 106.

Figure 2:
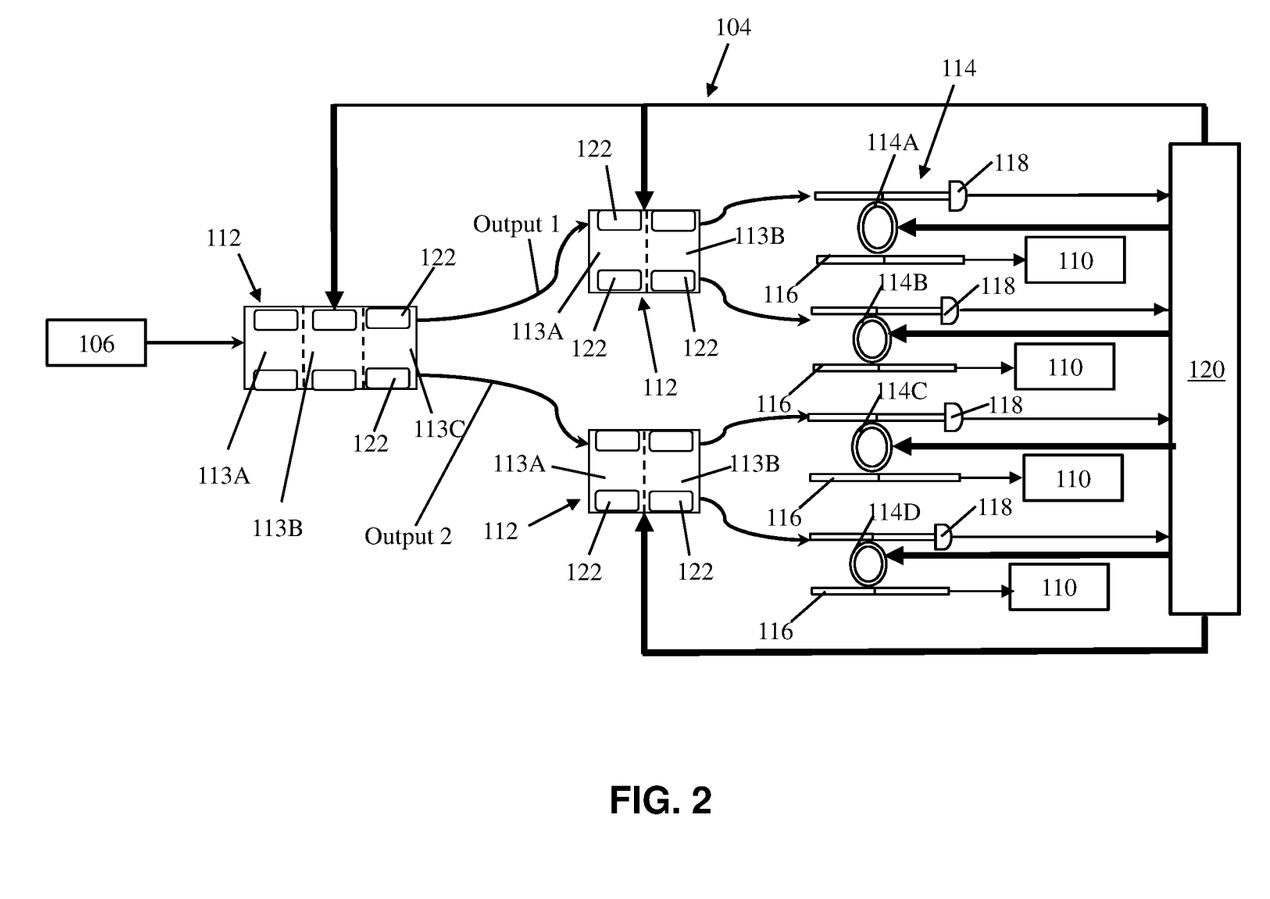
FIG. 2 shows a schematic view of a demultiplexer according to embodiments of the disclosure.

Turning to FIG. 2, an embodiment of demultiplexer 104 is shown according to various embodiments of the disclosure. Demultiplexer 104 is structured for the processing of multiplexed optical inputs from optical fiber 106. Demultiplexer 104 includes various components for separating a single optical signal into component optical signals, and filtering signal wavelengths outside a predetermined bandwidth. Conventional multiplexer architectures typically include, e.g., several stages of similar or identical components for successively filtering and/or deconstructing one optical signal into demultiplexed optical signals. Such architectures are often associated with significant signal loss (measured, e.g., in decibels (dB) as a ratio of signal intensity between the demultiplexed signal(s) and the multiplexed signal), or crosstalk (i.e., overlapping wavelength bandwidths between two or more demultiplexed signals). Embodiments of the disclosure overcome these technical challenges by combining several types of components when demultiplexing optical signals from an optical input.

Demultiplexer 104 may include a plurality of Mach-Zehnder Interferometric (MZI) stages 112, each having a set of Mach-Zhender Interferometers (MZIs) 113, e.g., MZIs 113A, 113B, 113C therein. MZI stage(s) 112 alternatively may be known as a "filter stage" of demultiplexer 104. Each MZI stage 112 may be made up of several MZIs 113, and MZIs 113 may be the fundamental components which allow MZI stage(s) 112 to process optical inputs in the form of a multiplexed optical signal. An MZI is a fundamental component of optical processing hardware. Each MZI stage 112 operates by using a combination of reflective surfaces and light-selective screens to split a single light source into two distinct, coherent light beams. The resulting light beams each may have a distinct relation in wavelength-space to each other. In the path of each light beam phase shift elements or delay lines may be inserted. In a second device using a combination of reflective surfaces and light-selective screens the two beams are combined and interfered with each other.

In each MZI 113, an incoming signal is split into two paths and then delayed (thus, phase shifted) relative to the signal in the other path. The resulting two light waves are then being interfered within MZI 113 interferometer. If the two light waves have the exact same amplitude but a phase shift of 7C radians, then they perfectly extinguish each other and the resulting wave has zero intensity. For a complete extinction between the two waves, two conditions must be fulfilled. First, the two waves must have exact same amplitude. Second, the two signals must have a phase shift of (nit) where n=1, 3, 5, 7, 9, etc., through all odd natural numbers. where n=0, 2, 4, 6, 8, etc., through all even natural numbers (including zero) then MZI 113 under analysis will produce the original signal.

Figure 3:
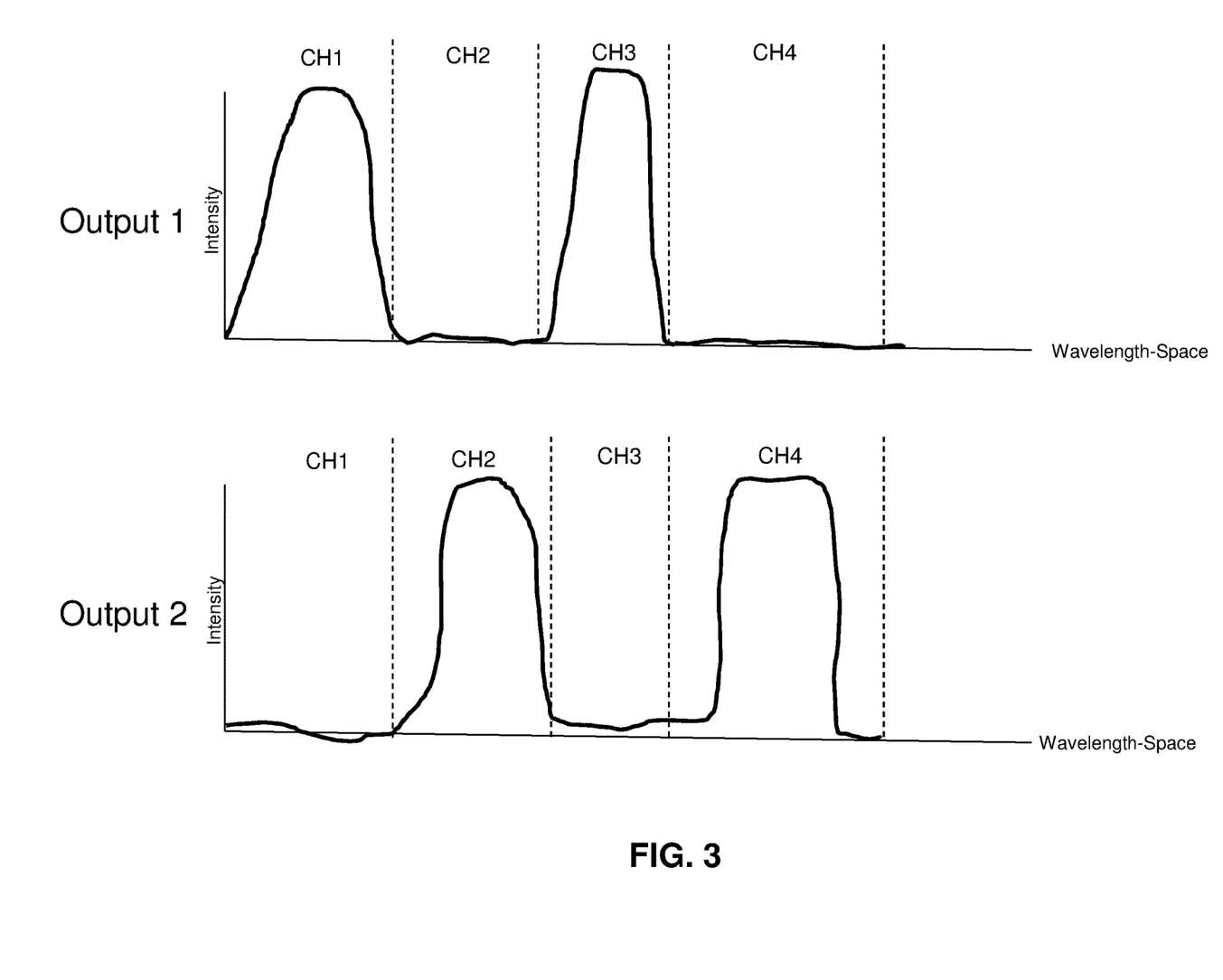
FIG. 3 shows an illustrative plot of two signal outputs from a first MZI stage according to embodiments of the disclosure.

Referring to FIGS. 2 and 3 together, the operation of MZI stages 112 and their component MZIs 113 is described in more detail. In each MZI 113, a set of "delay lines" may cause the processed waves to exhibit a particular phase shift. The amount of phase shift produced by the delay lines is wavelength dependent, thereby allowing each MZI 1113 to have specific wavelength-dependent characteristics. Combining several MZIs 113 into one stage produces a complex pattern of extinction and pass bands. The delay lines within each MZI 113 also provide a fixed phase shift for a particular wavelength. As discussed elsewhere herein, various phase shift elements may be coupled to MZI(s) 113 in each MZI stage 112 to manipulate the phase shift during operation. FIG. 3 illustrates one MZI stage 112 for separating an optical input into a first optical output ("output 1") and a second optical output ("output 2").

As shown, MZI stage 112 may be configured to produce output 1 with data within two portions of wavelength-space (i.e., channels CH1 and CH3) without any data within two other portions of wavelength-space (i.e., channels CH2, CH4). By contrast the same MZI stage 112 may also produce output 2 with data within channels CH2, CH4 without any data within the other two channels CH1, CH3. In this example, two downstream MZI stages 112B and 112C may break up each signal (output 1 and output 2) into individual signals for each channel CH1, CH2, CH3, CH4. In cases where an optical input features four channels within wavelength-space, the first stage 112A of the wavelength division de-multiplexer separates the four channels in an interlaced scheme as discussed herein.

Referring again to FIG. 2, MZI stages 112 of demultiplexer 104 may convert a multiplexed optical input from optical fiber 106 into distinct component optical signals. As noted herein, each component optical signal may correspond to a particular set of wavelength-space components of the optical signal provided thereto. According to an example, demultiplexer 104 may include a first MZI stage 112A for separating an optical input from optical fiber 106 into two different intermediate component optical signals. According to an example, first MZI stage 112A may be configured to output two intermediate component output signals (e.g., output 1 and output 2, discussed herein) with a specific spectrum in the wavelength-space. In this example, each intermediate component optical signal produced with first MZI stage 112A may represent half of the total wavelength-space of the original optical input from optical fiber 106. Demultiplexer 104 may also include a second MZI stage 112B and a third MZI stage 112C, each of which may receive one of the two intermediate component optical signals produced from first MZI stage 112A. Second MZI stage 112B and third MZI stage 112C may be structured similarly or identically to each other, or more generally may be configured to convert one of the two intermediate component optical signals into pairs of component optical signals. In this case, second MZI stage 112B may convert one intermediate component optical signal into a first component optical signal and a second component optical signal, while third MZI stage 112C may convert the other intermediate component optical signal into a third component optical signal and a fourth component optical signal.

Together, MZI stages 112A, 112B, 112C may produce four parallel component optical signals. Although three MZI stages 112 are shown in an example for producing four component optical signals from one optical input, the number of MZI stages 112 may vary between embodiments, the number of signals to be demultiplexed, and/or based on the desired number of component optical signals. In some cases, the number of MZI stages 112 may be increased such that an incoming multiplexed optical input may be split and filtered with more channel separation and less cross-talk. The component optical signals produced by MZI stages 112 maybe transmitted to a plurality of bandpass filters 114. A "filter" refers to any device configured to receive inputs from a particular source, transmit portions of the signal meeting predetermined criteria to another component, and reject any portions of the signal which do not meet the predetermined criteria. A "bandpass filter" refers to any filter which transmits portions of a signal within a predetermined band of frequencies or wavelengths (i.e., within minimum and maximum acceptable values), and rejects all portions of the signal outside the predetermined band of frequencies or wavelengths.

Bandpass filters 114 may take the form of optical filters configured to accept or reject portions of an optical signal within a predetermined range of wavelengths. More specifically, bandpass filters may be embodied as one or more tunable resonant drop ring filters, the features of which are discussed in detail elsewhere herein. During operation, bandpass filters 114 will not subdivide incoming optical component signals into a group of wavelength-space components, but instead will remove portions of an optical signal outside a desired range of wavelengths. Each bandpass filter 114 thus may accept a different range of wavelengths, based on the MZI(s) 112 from which it receives a component optical signal. According to one example, bandpass filters 114 each may have a passband of, e.g., approximately thirteen nanometers (nm) for processing different ranges of wavelengths. In such an example, bandpass filters 114 may include a first bandpass filter 114A for accepting wavelengths between approximately 1265 nm to approximately 1278 nm, a second bandpass filter 114B for accepting wavelengths between approximately 1285 nm to approximately 1298 nm, a third bandpass filter 114C for accepting wavelengths between approximately 1305 nm and approximately 1318 nm, and a fourth bandpass filter 114D for accepting wavelengths between approximately 1325 nm and approximately 1338 nm.

Each bandpass filter 114 may take the form of, e.g., an optical ring resonator for filtering optical signals within a predetermined range of wavelengths. An optical ring resonator is a set of interconnected waveguides, one of which takes the form of a closed loop between a waveguide for carrying an input optical signal and a waveguide for transmitting an output optical signal. The band of desired wavelengths for each bandpass filter 114 may be known as "resonance wavelengths," while rejected wavelengths may be considered "non-resonant wavelengths." During operation, light of the resonant wavelength(s) is passed through the loop from the input waveguide, and increases in its intensity over multiple round-trips through the closed loop ("ring"). The transmitted optical signals may undergo constructive interference as they pass through the closed loop, before being output to an output "bus" waveguide which serves as a detector waveguide. Non-resonant optical signals will not be able to pass through the loop, and thus will be rejected. Although bandpass filters 114 may take the form of an optical ring resonator in various embodiments, it is understood that other wavelength-defined optical filters may be used as bandpass filters 114 in various other embodiments.

However embodied, bandpass filters 114 will process each component optical signal from MZI stage(s) 112 to yield a plurality of demultiplexed optical signals. Each demultiplexed optical signal may include a predetermined wavelength-space subset of the original multiplexed optical input (e.g., based on the MZI stage 112 configuration) which has been filtered over a desired wavelength band using a respective bandpass filter 114. A group of optical output lines 116 may be optically connected to bandpass filters 114, such that each optical output line 116 transmits a demultiplexed output signal from one bandpass filter 114. Optical components 110 may be coupled to optical output lines 116, such that each optical component 110 may receive and interpret one of the demultiplexed optical signals.

Figure 4:
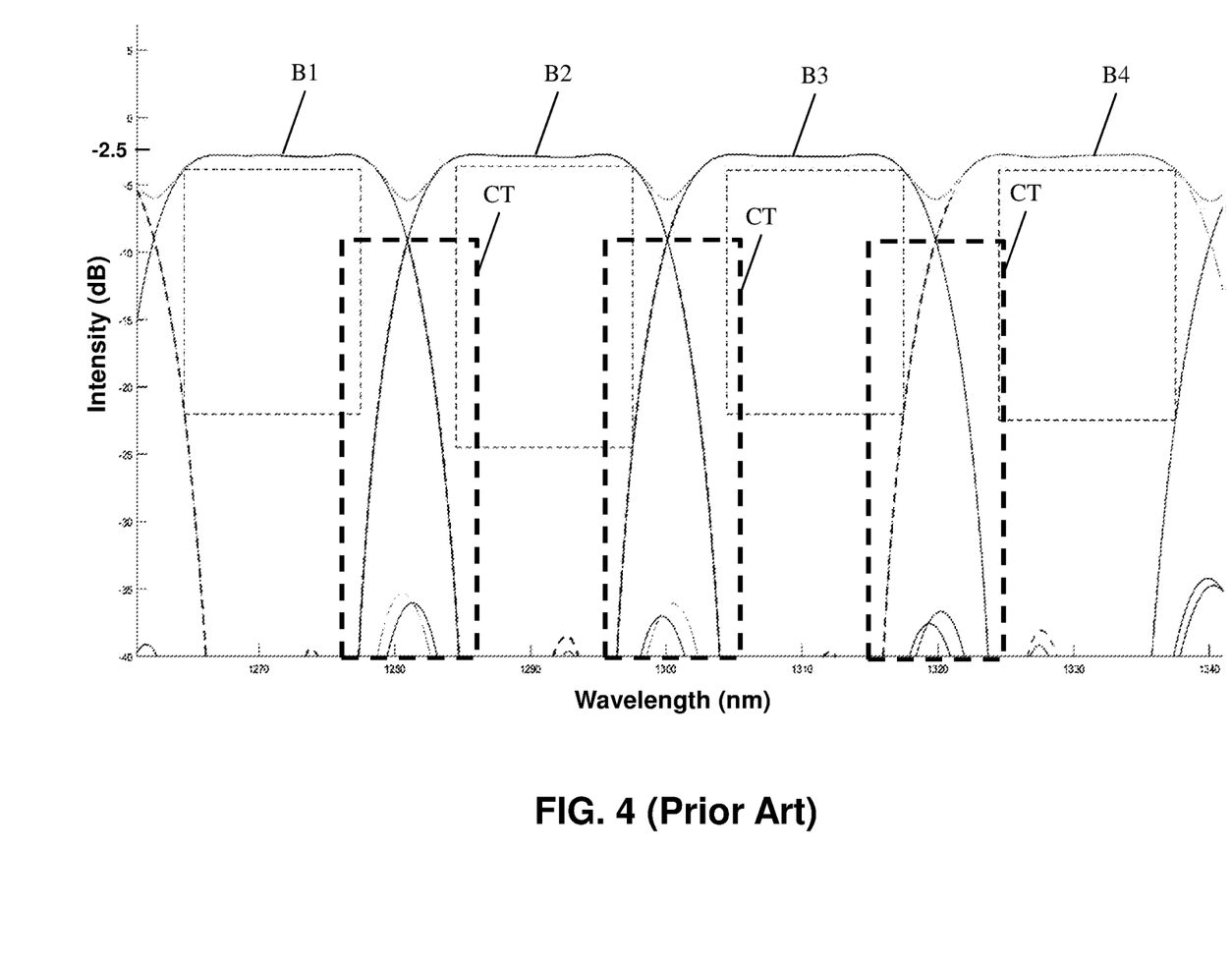
FIG. 4 shows an illustrative plot of optical intensity versus wavelength in a conventional demultiplexing system.

Referring briefly to FIG. 4, embodiments of the disclosure may use MZI stages 112 (FIG. 2) together with bandpass filters 114 (FIG. 2) to address various technical shortcomings and limitations of conventional systems and/or processes to demultiplex an optical signal. FIG. 4 provides a representative plot of output signal intensity in decibels (dB) versus wavelength in nm for an optical signal that is demultiplexed according to conventional processes and/or systems. In each representative plot, signal intensity may be calculated, e.g., as a dimensionless value indicating a base-ten logarithm of the ratio between the output signal amplitude over the input signal amplitude. FIG. 4 illustrates an optical signal separated into four wavelength bands B1, B2, B3, B4 each having a range of, e.g., approximately fifteen nm. The signal intensity loss for each wavelength band B1, B2, B3, B4 is shown to be at least −2.5 dB over a respective range of wavelengths. In addition, each wavelength band B1, B2, B3, B4 is shown to overlap with a portion of the adjacent wavelength band B1, B2, B3, B4 within a particular region CT. Region CT indicates "crosstalk" between adjacent wavelength bands for demultiplexed optical signals. Crosstalk refers to a processed (e.g., demultiplexed) signal creating an undesired effect in another circuit or channel, e.g., as a result of non-destructive interference from one circuit or channel to another. In the case of optical demultiplexing, regions CT are created by unfiltered wavelengths overlapping with each other, thereby creating artifacts which decrease the clarity of an output signal and/or include information intended to be output in another wavelength band. In conventional processing, regions CT indicate crosstalk as occurring at signal intensities of, e.g., approximately −10 dB.

Figure 5:
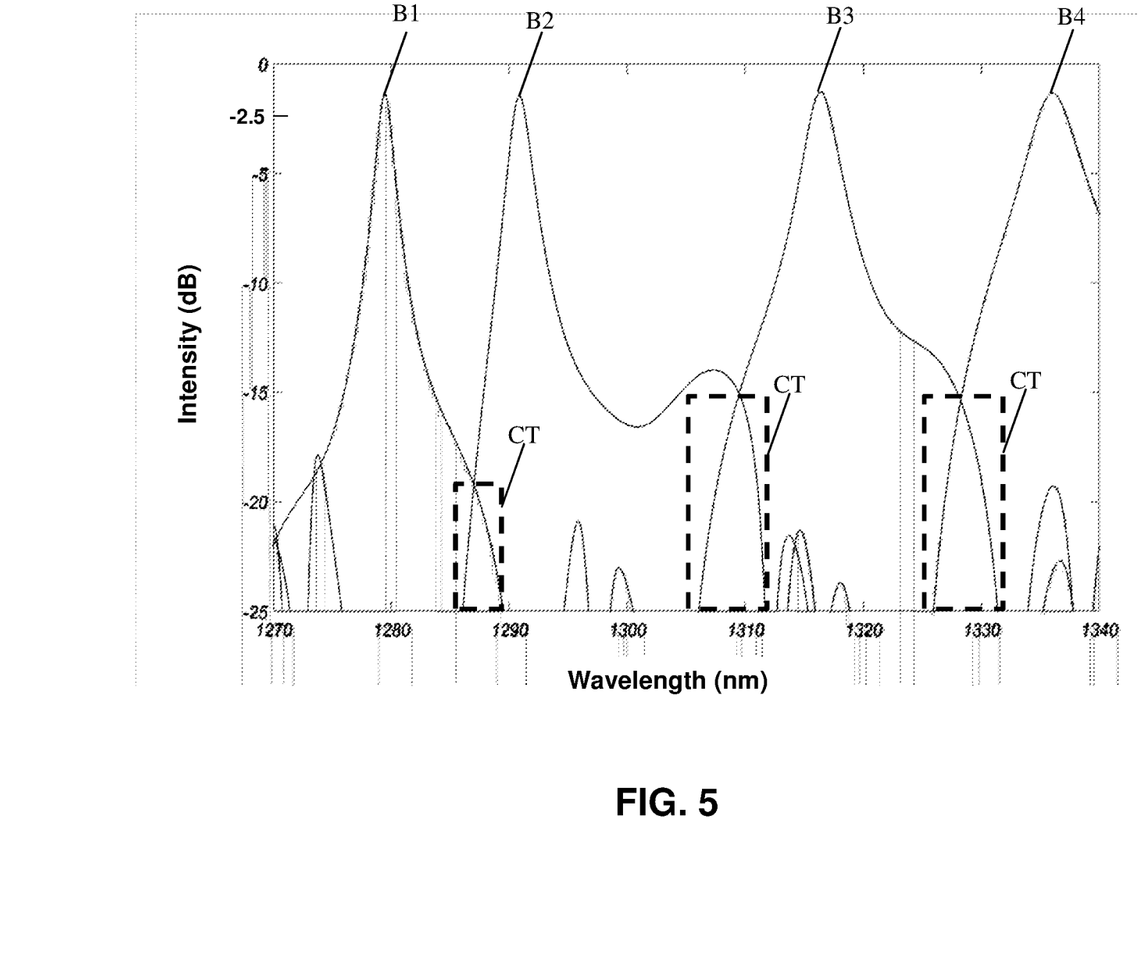
FIG. 5 shows an illustrative plot of optical intensity versus wavelength in a demultiplexer according to embodiments of the disclosure.

FIG. 5 provides a representative plot of output signal intensity in decibels versus wavelength for an optical signal that is demultiplexed via an embodiment of assembly 100 (FIG. 2). As compared to the conventional output shown in FIG. 4, embodiments of assembly 100 provide greater signal processing performance than conventional demultiplexing assemblies and/or techniques. For example, the combination of MZI stage(s) 112 (FIG. 2) and bandpass filters 114 (FIG. 2) causes the output intensity loss to have a magnitude of at most 2.5 dB at the peak of each demultiplexed wavelength band B1, B2, B3, B4, using the same input signals from the FIG. 4 implementation. Additionally, regions CT indicating crosstalk are shown to occur only at outlying extremities of each wavelength band, and with loss intensities of approximately −15 dB or in some cases −20 dB. FIG. 5 thus demonstrates that the combination of MZI stage(s) 112 and bandpass filters 114 provide greater demultiplexing performance than conventional assemblies, even those which may use MZI stages, bandpass filters, or similar components in isolation without using a configuration according to the disclosure, e.g., similar to assembly 100.

Returning to FIG. 2, embodiments of assembly 100 may include various additional features for calibration and/or active control over the processing of multiplexed optical signals via MZI stages 112 and/or bandpass filters 114. As noted elsewhere herein, bandpass filters 114 may include an optical ring resonator and/or similar device for accepting signals of a resonant wavelength while rejecting non-resonant wavelengths. In some cases, MZI stages 112 may produce optical component signals that are non-resonant with respect to the bandpass frequencies of a corresponding bandpass filter 114. Changes in ambient temperature may affect the manner in which MZI stage 112 separate an incoming optical signal into multiple component optical signals. To identify such circumstances, assembly 100 may include a group of photo sensors 118 each coupled to a corresponding one of the various bandpass filters 114.

Each photo sensor 118 may take the form of, e.g., a pin-diode or any other device configured to emit an electrical output in response to receiving an optical input. Photo sensors 118 may be configured to detect and output any optical component signals which have been rejected by bandpass filter(s) 114, i.e., those outside a predetermined wavelength band. For example, one bandpass filter 114 may be configured to accept light between approximately 1265 nm to approximately 1278 nm. In the event that bandpass filter 114 receives light having a wavelength less than 1265 nm or greater than approximately 1278 nm, a corresponding photo sensor 118 may detect the rejected light when it is not transmitted to output line 116. Photo sensor(s) 118 thus may indicate any misalignment between a component optical signals and a wavelength passband for its corresponding bandpass filter 114. When photo sensor(s) 118 detect light rejected by bandpass filter(s) 114, an operator and/or manufacturer may manually modify MZI(s) 112 (i.e., the transfer function of the MZI through electrically controlled built-in devices, the temperature of the MZ, etc.) and/or other attributes of assembly 100. In further embodiments, assembly 100 itself may include further components for accounting for component optical signals that have been rejected by bandpass filter(s) 114.

Embodiments of assembly 100 may include various components for active calibration and/or control to account for component optical signals with a non-resonant wavelength, e.g., as detected by bandpass filter(s) 114. Assembly 100 may include a controller 120 coupled to bandpass filter(s) 114, and/or photo sensor(s) 118 where applicable, to identify non-resonant optical component signals rejected by bandpass filter(s) 114. Controller 120 may be configured to modify the operation of MZI stage(s) 112 and/or other elements of assembly 100 to account to prevent other non-resonant optical signals from being processed during continued operation. Controller 120 may take the form of a computing device configured to electrically control various characteristics of MZI stage(s) 112, e.g., through one or more phase shift elements 122, e.g., electrically and/or thermally-driven devices for adjusting the phase shift(s) implemented by MZI(s) 113, operatively connected thereto. According to an embodiment, controller 120 includes a computer infrastructure that can perform various process steps described herein for applying different amounts of power to MZI stage(s) 112, e.g., in response to signals transmitted by photo sensor(s) 118. In particular, the computer infrastructure of controller 120 may include one or computing devices configured to vary the amount(s) of power applied to MZI sage(s) 112 by performing the process steps of the disclosure.

Each phase shift element 122 may take the form of any device capable of providing an adjustable phase shift within MZI(s) 113 and thus MZI stage(s) 112. Phase shift element(s) 122 thus may include, e.g., electrically and/or thermally operated components for modifying the operation of MZI(s) 113 and/or MZI stage(s) 112. Each phase shift element 122 may operate by delaying, and thus phase shifting, the light waves passing through one pathway within MZI(s) 113. The amount of the resulting phase shift may be proportional to an input variable, e.g., the temperature of and/or amount of electrical power applied to phase shift element 122. MZI(s) 113 may be operably coupled to multiple phase shift elements 122, such that each phase shift element 122 is capable of tuning out a fixed phase shift introduced by one or more delay lines of the device. It is noted that phase shift elements 122 operate by slowing down optical signals within MZI(s) 133, and to shift the phase backwards phase shift element(s) 122 may be adjusted to use a $2\pi$ periodicity of the corresponding signal.

Phase shift element(s) 122 may be embodied as one or more electrical phase shifters and/or thermal phase shifters coupled to controller 120. In the case of a thermal phase shifter, phase shift element(s) 122 may include, e.g., an electrically-adjustable resistive heater, heating coil, heat exchanger, and/or other currently known or later developed device for heating one or more elements (e.g., MZI stage(s) 112) in thermal communication with phase shift element 122. In the case of an electrical phase shifter, phase shift element(s) 122 may include a diode, Kerr Effect material, and/or other device for widening or narrowing of an electrical within MZI(s) 113. However embodied, adjusting the phase shift within MZI stage(s) 112 will affect the wavelength-space boundary (i.e., the dividing wavelength) between two component optical signals produced from one MZI stage 112. Each phase shift element 122 may be positioned at any location in thermal communication with MZI stage(s) 112, and in a particular embodiment may include one or more undercut heaters positioned on the same portion of a device and/or substrate where MZI stage(s) 112 are formed. According to an example, controller 120 may be electrically coupled to various heating elements 122 to control the thermal energy output of one or more heating elements 122 within assembly 100. In still further embodiments, phase shift element(s) 122 and/or the phase shift adjustments therefrom may be manually operated and/or adjusted without the aid of controller 120. Phase shift element(s) 122 alone, or in conjunction with controller 120, may apply a thermal output to MZI(s) 113 which produce non-resonant component optical signals. The applying of heat from phase shift element(s) 122 may be selective, and based on detecting a non-resonant component optical signal via bandpass filter(s) 114 and/or photo sensor(s) 118.

Figure 6:
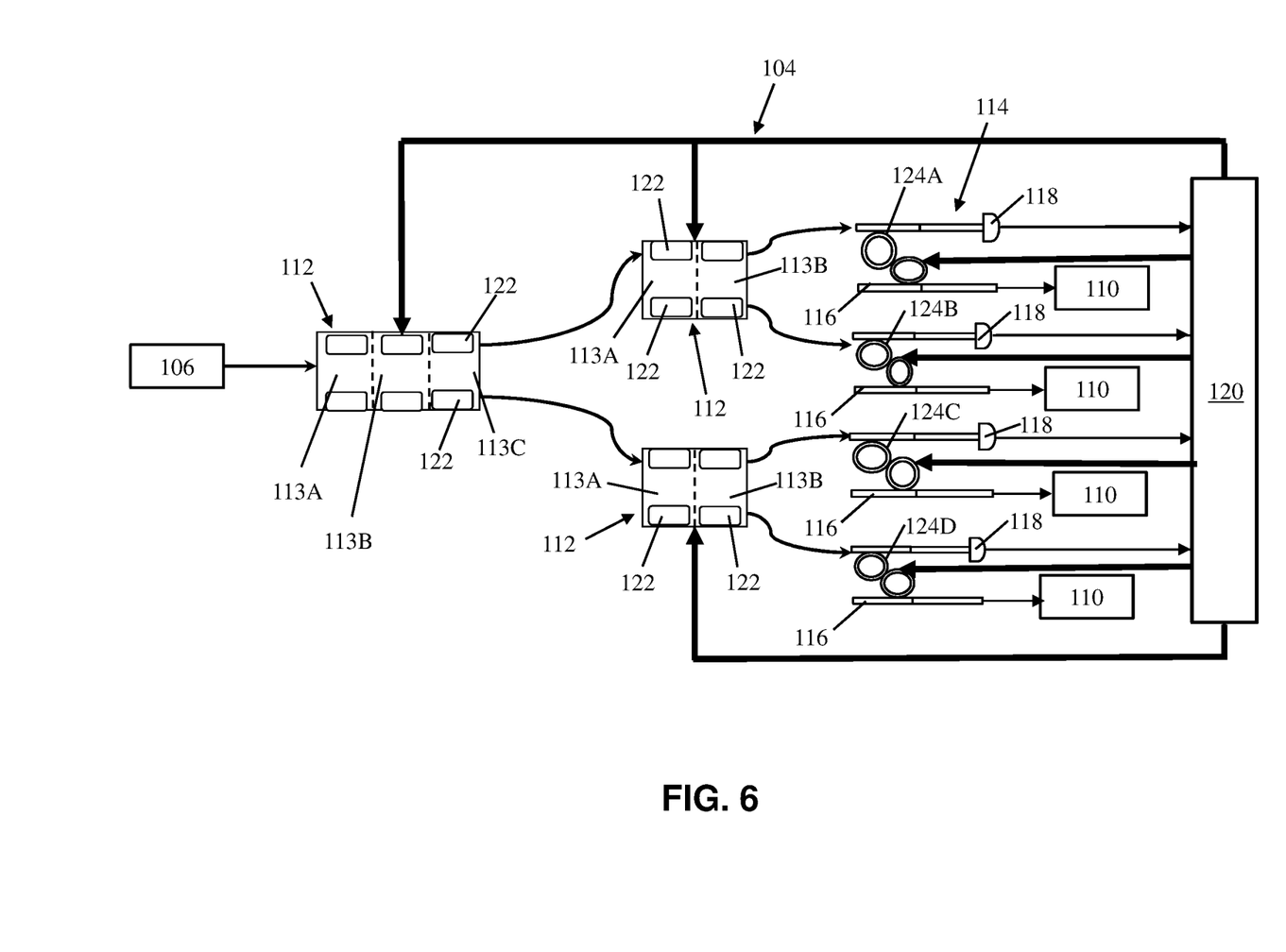
FIG. 6 shows a schematic view of a demultiplexer according to further embodiments of the disclosure.

Referring briefly to FIG. 6, further embodiments of assembly 100 may include bandpass filter(s) 114 with additional or alternative features to adjust the filtering of component optical signals into demultiplexed optical signals. For example, one or more bandpass filter(s) 114 may include double optical ring resonator(s) 124A, 124B, 124C, 124D between respective MZI stage(s) 112B, 112C and output line(s) 116. Each double optical ring resonator 124A, 124B, 124C, 124D may function similarly or identically to other optical ring resonators described herein, but may include further features to increase signal fidelity and/or reduce decibel loss in a demultiplexed optical output. Specifically, each double optical ring resonator 124A, 124B, 124C, 124D may include two closed loop optical fibers connected to each other in series, thereby increasing the total amount of constructive interference as a signal is processed. Such a configuration may also increase the selectivity of bandpass filter(s) 114. In this case, phase shift element(s) 122, in conjunction with controller 120 where applicable, may respond more quickly to the presence of non-resonant component optical signals upon their detection, e.g., by photo sensor(s) 118.

Figure 7:
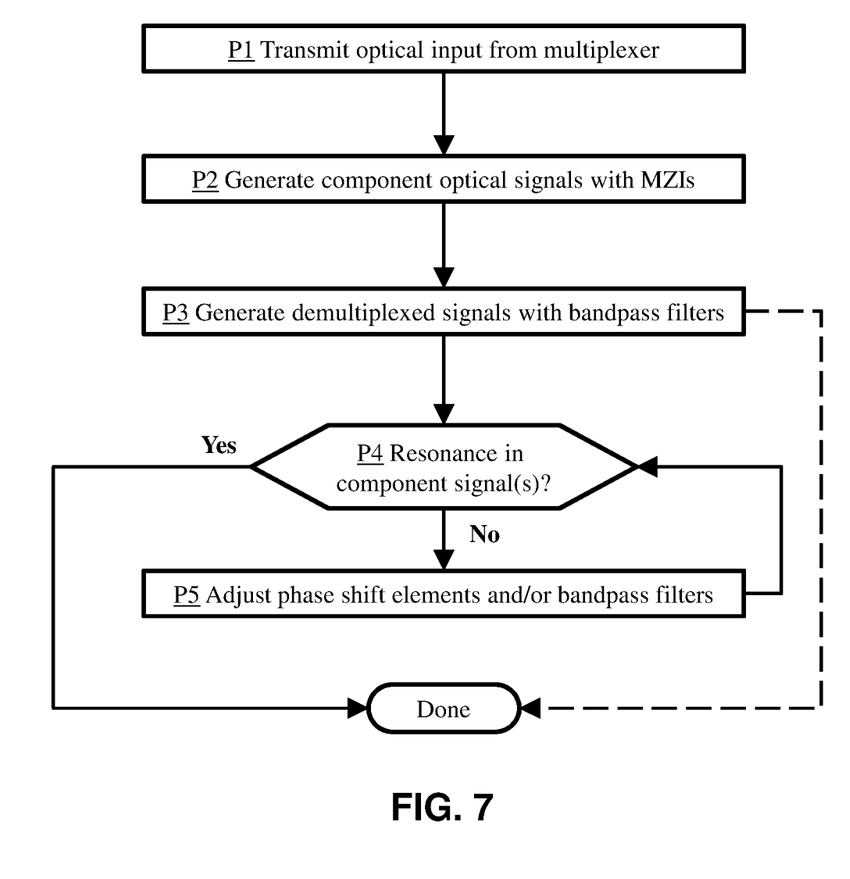
FIG. 7 shows an illustrative flow diagram for demultiplexing an optical input according to embodiments of the disclosure.

Referring now to FIGS. 2 and 7 together, embodiments of the disclosure provide an operational methodology for the demultiplexing of an optical signal transmitted from a multiplexer 102 (FIG. 1). Although the various example processes shown in FIG. 7 may be implemented in the order and/or manner described herein, it is understood that any of the various processes may be implemented in a different order, and/or in parallel with each other, to suit various alternative embodiments and implementations. The various method embodiments described herein and illustrative flow diagrams for implementing such embodiments should therefore not be considered as limiting.

Process P1 according to the disclosure may include, e.g., transmitting an optical input from multiplexer 102 (FIG. 1), e.g., through an optical fiber 106 in optical communication with demultiplexer 104 of assembly 100. The transmitted optical input may be received in one or more MZI stage(s) 112 for converting the optical input into multiple component optical signals differentiated by phase, as described herein. Process P2 according to the disclosure may include, e.g., generating multiple component optical signals from the input optical signal using any desired number of MZI stage(s) 112. As noted elsewhere herein, the number of MZI(s) 113 and/or MZI stages 112 may affect the boundaries in wavelength-space between the component optical signals. Process P2 thus may be include one or more processes for separating a single multiplexed optical signal into multiple component optical signals each corresponding to one of the original optical signals before multiplexing. The component optical signals generated in process P2, however, may include cross-talk and/or noise introduced through the multiplexing and/or demultiplexing processes.

To reduce noise and/or cross-talk in the component optical signals, embodiments of the disclosure may include process P3 of generating a set of demultiplexed optical signals using bandpass filters 114. As noted elsewhere herein, each bandpass filter 114 may receive a corresponding one of the previously generated component optical signals from MZI stage(s) 112. Bandpass filter(s) 114 may include, e.g., a group of four bandpass filters 114A, 114B, 114C, 114D, one or more of which may be an optical ring resonator. Bandpass filters 114 in some cases may include double optical ring resonator(s) 124A, 124B, 124C, 124D as noted herein. Bandpass filters 114 may be configured to accept component optical signals over a predetermined frequency band (e.g., a range spanning up to approximately thirteen nm) for transmission to optical component(s) 110. As noted elsewhere herein, methods according to the disclosure may cause the demultiplexed optical signals to have an intensity change of at most approximately 2.5 dB relative to the multiplexed optical input. The resulting group of demultiplexed optical signals thus will each have a respective wavelength corresponding to the passband frequency of one bandpass filter 114. In some implementations, the method may end ("Done") after process P3 concludes. In further embodiments, additional processes may be implemented to further refine the demultiplexed optical signals and/or reduce noise, crosstalk, etc., therefrom.

Methods according to the disclosure may include, e.g., process P4 of determining whether the component optical signal(s) transmitted to bandpass filter(s) 114 include a resonant wavelength. The determination in process P4 may be implemented, e.g., using photo sensor(s) 118 as described elsewhere herein. In cases where bandpass filter(s) 114 reject at least a portion of the component optical signal (i.e., "No" at process P4), the method may continue to process P5 for adjusting bandpass filter(s) 114 and/or phase shift element(s) 122 to control the operation of MZI stage(s) 112. Such modifications may include, e.g., process P5 of electrically thermally adjusting the amount of phase shift applied by phase shift element(s) 122 to MZI stage(s) 112. The adjusting in process P5 may be implemented at least partially with the aid of controller 120, which may modify the amount of applied heat based on, e.g., a degree of mismatch between the component optical signal wavelength and the passband wavelength for one or more bandpass filters 114. Additionally or alternatively, controller 120 may adjust bandpass filter(s) 114, e.g., to filter the upper and lower threshold frequencies for a particular passband. Adjusting the bandpass filter(s) 114 and/or phase shift element(s) 122 may affect, e.g., a wavelength-space boundary by which MZI stage(s) 112 separate an incoming optical signal into two or more component optical signals. The method may then return to process P4 of determining whether the component optical signals are in resonance with the passband frequency of bandpass filter(s) 114. Processes P4, P5 may be repeated in a looping fashion until bandpass filter(s) 114 are able to process incoming component optical signals. In cases where the component optical signal(s) are accepted by bandpass filter(s) 114 (i.e., "Yes" at process P4), the method may conclude ("Done") without further adjusting of assembly 100.

Embodiments of the disclosure may provide various technical and commercial advantages, some of which are described by example herein. In contrast to conventional demultiplexing assemblies, embodiments of the disclosure combine various signal processing devices (e.g., MZI stages, bandpass filters, etc.) to provide robust demultiplexing functionality while maintaining better signal fidelity than conventional demultiplexing assemblies (e.g., those which apply more than three MZI stages in isolation and/or which only use combinations of optical filters). Embodiments of the disclosure thus reduce loss, preserve tuning power, and provide greater freedom over wavelength-space channel spacing. Embodiments of the disclosure also provide phase shift element(s) 122 in conjunction with MZI stage(s) 112 to provide active control in response to changing temperatures and/or other environmental conditions. As noted elsewhere herein, embodiments of the disclosure may provide a signal intensity change of at most approximately 2.5 dB while substantially preventing crosstalk between adjacent wavelength bands.

The descriptions of the various embodiments of the present disclosure have been presented for purposes of illustration, but are not intended to be exhaustive or limited to the embodiments disclosed. Many modifications and variations will be apparent to those of ordinary skill in the art without departing from h scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A demultiplexer for processing a multiplexed optical input, the demultiplexer comprising:
    a plurality of Mach-Zehnder Interferometric (MZI) stages for outputting a plurality of component optical signals, each of the plurality of component optical signals corresponding to a respective wavelength-space component of the multiplexed optical input;
    a plurality of bandpass filters each having a respective wavelength passband, and receiving a respective one of the plurality of component optical signals, wherein the plurality of bandpass filters generates a plurality of demultiplexed optical signals;
    at least one phase shift element coupled to the plurality of MZI stages; and
    a controller operatively coupled to the at least one phase shift element and each of the plurality of bandpass filters, wherein the controller adjusts the electrical biasing of the at least one phase shift element based on at least one of the plurality of demultiplexed optical signals.

2. The demultiplexer of claim 1, wherein each of the plurality of bandpass filters comprises at least one optical ring resonator.

3. The demultiplexer of claim 1, further comprising a photo sensor coupled to a selected one of the plurality of bandpass filters, wherein the photo sensor indicates misalignment between one of the plurality of component optical signals and a wavelength passband of the selected one of the plurality of bandpass filters.

4. The demultiplexer of claim 3, further comprising a controller operatively coupled to each of the plurality of bandpass filters, wherein the controller adjusts the wavelength passband of at least one of the plurality of bandpass filters based on the indicated misalignment.

5. The demultiplexer of claim 1, wherein the plurality of MZI stages and the plurality of bandpass filters are configured to generate the plurality of demultiplexed optical signals with an intensity change of less than 2.5 decibels (dB) relative to the multiplexed optical input.

6. The demultiplexer of claim 1, further comprising a plurality of optical output lines each coupled to a respective one of the plurality of bandpass filters, and configured to transmit the respective one of the plurality of demultiplexed optical signals to an optical component.

7. A demultiplexer for processing a multiplexed optical input, the demultiplexer comprising:
    a first Mach-Zehnder interferometric (MZI) stage receiving the multiplexed optical input, wherein the first MZI stage outputs a first intermediate optical signal and a second intermediate optical signal;
    a second MZI stage receiving the first intermediate optical signal from the first MZI stage, wherein the second MZI stage outputs a first component optical signal and a second component optical signal;
    a third MZI stage receiving the second intermediate optical signal from the first MZI stage, wherein the third MZI stage outputs a third component optical signal and a fourth component optical signal;
    a plurality of bandpass filters each having a respective wavelength passband, and receiving a respective one of the first component optical signal, the second component optical signal, the third component optical signal, and the fourth component optical signal, wherein the plurality of bandpass filters generates a plurality of demultiplexed optical signals; and
    a photo sensor coupled to a selected one of the plurality of bandpass filters, wherein the photo sensor indicates misalignment between one of the plurality of component optical signals and a wavelength passband of the selected one of the plurality of bandpass filters.

8. The demultiplexer of claim 7, wherein each of the plurality of bandpass filters comprises an optical ring resonator.

9. The demultiplexer of claim 7, further comprising at least one phase shift element coupled to the first MZI stage, the second MZI stage, or the third MZI stage, wherein the phase shift element controls a wavelength-space boundary between each of the plurality of component optical signals.

10. The demultiplexer of claim 9, further comprising a controller operatively coupled to the at least one phase shift element and the plurality of bandpass filters, wherein the controller and the at least one phase shift element adjusts the wavelength-space boundary between each of the plurality of demultiplexed optical signals based on at least one of the plurality of demultiplexed optical signals.

11. The demultiplexer of claim 7, wherein the plurality of bandpass filters are configured to generate the plurality of demultiplexed optical signals with an intensity change of less than 2.5 decibels (dB) relative to the multiplexed optical input.

12. The demultiplexer of claim 7, further comprising a plurality of optical output lines each coupled to a respective one of the plurality of bandpass filters, and configured to transmit the one of the plurality of demultiplexed optical signals to an optical component.

13. A method for demultiplexing an optical signal transmitted from a multiplexer, the method comprising:
   generating a plurality of component optical signals with a plurality of Mach-Zehnder Interferometric (MZI) stages, each of the plurality of component optical signals corresponding to a respective wavelength-space component of the multiplexed optical input, wherein each of the plurality of MZI phases includes at least one phase shift element;
   generating a plurality of demultiplexed optical signals by transmitting the plurality of component optical signals to a plurality of bandpass filters each having a respective wavelength; and
   adjusting an electrical biasing of the phase shift element based on at least one of the plurality of demultiplexed optical signals to control a wavelength-space boundary between each of the plurality of component optical signals.

14. The method of claim 13, wherein each of the generated plurality of demultiplexed optical signals spans a wavelength range of at most approximately thirteen nanometers.

15. The method of claim 13, wherein the generated plurality of demultiplexed optical signals have an intensity change of less than 2.5 decibels (dB) relative to the multiplexed optical input.

* * * * *